(12) United States Patent
Delehouze et al.

(10) Patent No.: US 10,022,923 B2
(45) Date of Patent: Jul. 17, 2018

(54) METHOD OF REPAIRING A PERFORATED SKIN OF A PANEL USING A DOUBLER

(71) Applicant: SAFRAN NACELLES, Gonfreville L'Orcher (FR)

(72) Inventors: Arnaud Delehouze, Gonfreville L'Orcher (FR); Sylvain Sentis, Gonfreville L'Orcher (FR); Philippe Prunin, Gonfreville L'Orcher (FR); Aristide Boudard, Gonfreville L'Orcher (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 0 days.

(21) Appl. No.: 15/585,426

(22) Filed: May 3, 2017

(65) Prior Publication Data

US 2017/0232693 A1 Aug. 17, 2017

Related U.S. Application Data

(63) Continuation of application No. PCT/FR2015/052937, filed on Oct. 30, 2015.

(30) Foreign Application Priority Data

Nov. 3, 2014 (FR) ..................................... 14/60577

(51) Int. Cl.
*B23P 6/00* (2006.01)
*B23P 19/04* (2006.01)
(Continued)

(52) U.S. Cl.
CPC ............ *B29C 73/10* (2013.01); *B29C 70/443* (2013.01); *B29C 70/74* (2013.01); *B29C 73/32* (2013.01);
(Continued)

(58) Field of Classification Search
CPC ....... G10K 11/172; B29C 73/10; B29C 65/00; B29C 65/48; B29C 65/4825; B29C 65/50;
(Continued)

(56) References Cited

U.S. PATENT DOCUMENTS 5,022,943 A * 6/1991 Zaima .................. B29D 24/005
156/222
5,653,836 A * 8/1997 Mnich ..................... B29C 73/02
156/98

(Continued)

FOREIGN PATENT DOCUMENTS

EP 1859923 11/2007

OTHER PUBLICATIONS

International Search Report for International Application PCT/FR2015/052937, dated Jan. 29, 2016.

*Primary Examiner* — Philip C Tucker
*Assistant Examiner* — Brian R Slawski
(74) *Attorney, Agent, or Firm* — Burris Law, PLLC

(57) ABSTRACT

The present disclosure relates to a method of repairing a damaged portion of a perforated skin of a panel using a doubler made of composite material which is designed to be applied to the damaged portion of the perforated skin. The method includes at least one step in which a sealing film is applied to the damaged portion of the perforated skin in order to temporarily seal the perforations in the skin, and a step in which the doubler is produced over the previously deposited sealing film.

10 Claims, 1 Drawing Sheet

(51) Int. Cl.
| | |
|---|---|
| B29C 73/00 | (2006.01) |
| B29C 65/00 | (2006.01) |
| B29C 51/16 | (2006.01) |
| B29C 45/00 | (2006.01) |
| B29C 47/00 | (2006.01) |
| B32B 43/00 | (2006.01) |
| B32B 37/00 | (2006.01) |
| B32B 38/04 | (2006.01) |
| B32B 7/14 | (2006.01) |
| B32B 3/10 | (2006.01) |
| E04B 1/82 | (2006.01) |
| B29C 73/10 | (2006.01) |
| B29C 73/32 | (2006.01) |
| B29C 70/44 | (2006.01) |
| B29C 70/74 | (2006.01) |
| B29L 31/30 | (2006.01) |
| B32B 3/12 | (2006.01) |
| B29C 65/48 | (2006.01) |
| B32B 3/26 | (2006.01) |
| B29C 65/50 | (2006.01) |
| G10K 11/172 | (2006.01) |
| B29C 65/76 | (2006.01) |
| B32B 37/14 | (2006.01) |

(52) U.S. Cl.
CPC ...... *B29C 65/4825* (2013.01); *B29C 65/5042* (2013.01); *B29C 65/76* (2013.01); *B29C 66/242* (2013.01); *B29C 66/721* (2013.01); *B29C 66/72525* (2013.01); *B29L 2031/3076* (2013.01); *B32B 3/12* (2013.01); *B32B 3/266* (2013.01); *B32B 37/146* (2013.01); *B32B 2305/024* (2013.01); *B32B 2605/18* (2013.01); *G10K 11/172* (2013.01)

(58) Field of Classification Search
CPC ... B29C 65/5042; B29C 65/76; B29C 66/242; B29C 66/721; B29C 66/72525; B29C 70/00; B29C 70/04; B29C 70/28; B29C 70/44; B32B 3/12; B32B 3/266; B32B 2605/18; B32B 2305/024; B32B 37/1246; B32B 37/1292; B32B 37/146; B29L 2031/608
USPC ....... 156/60, 91, 92, 94, 152, 196, 212, 215, 156/242, 245, 250, 252, 253, 285, 286, 156/289, 290, 291, 307.1, 307.7; 428/116, 118, 131, 137, 138, 63; 264/511; 29/402.01, 402.09, 402.14, 29/402.15; 52/144, 145; 181/284, 290, 181/292

See application file for complete search history.

(56) References Cited

U.S. PATENT DOCUMENTS

| | | |
|---|---|---|
| 2003/0188821 A1 | 10/2003 | Keller |
| 2007/0275212 A1* | 11/2007 | Stadtlander ............ B29C 73/10 428/116 |
| 2007/0289692 A1* | 12/2007 | Bogue .................... B29C 73/06 156/98 |
| 2011/0259515 A1 | 10/2011 | Rotter |
| 2013/0164481 A1 | 6/2013 | Whitworth |

* cited by examiner

METHOD OF REPAIRING A PERFORATED SKIN OF A PANEL USING A DOUBLER

CROSS-REFERENCE TO RELATED APPLICATIONS

This application is a continuation of International Application No. PCT/FR2015/052937, filed on Oct. 30, 2015, which claims priority to and the benefit of FR 14/60577 filed on Nov. 3, 2014. The disclosures of the above applications are incorporated herein by reference.

FIELD

The present disclosure relates to a method for repairing a damaged portion of a perforated acoustic skin of a sandwich panel, in particular for an aircraft propulsion unit, and more particularly for a turbojet engine nacelle member.

BACKGROUND

The statements in this section merely provide background information related to the present disclosure and may not constitute prior art.

As it is known per se, an aircraft propulsion unit conventionally comprises a turbojet engine housed inside a nacelle.

The nacelle generally has a tubular structure comprising an air inlet upstream of the turbojet engine, a median section intended to surround a fan of the turbojet engine and the casing thereof, and a downstream section intended to surround the combustion chamber of the turbojet engine and accommodating if necessary thrust reversal means. It may be ended by an ejection nozzle whose outlet is located downstream of the turbojet engine.

In order to reduce the noise pollution generated by the turbojet engine, it is common to equip several parts of the nacelle and/or the turbojet engine with acoustic attenuation structures.

These parts of the nacelle and/or of the turbojet engine might be, for example, an inner surface of an air circulation flow path for a bypass turbojet engine, a nozzle or ejection cone surface, etc.

An acoustic attenuation structure has the shape of an acoustic panel of the alveolar-core sandwich type comprising, at least one resonator, for example of the honeycomb type, covered with an outer perforated skin (called acoustic skin) and with a solid inner skin (called support or structuring skin).

One and/or the other of these skins might be made of a composite material comprising a set of fibers (superposition of fibrous plies), embedded in a polymerized resin.

The inner and outer skins are surfaces of the panel which are exposed to the air flow circulating through the propulsion unit and may be damaged, and in particular undergo tearing, perforations, detachments for example at the skin/honeycomb acoustic structure interfaces.

It is therefore appropriate to repair the panel accordingly damaged so as to restore to the panel the properties thereof, in terms of acoustic performance and structural strength.

In case of a damage of a skin of the panel, said skin might be repaired by using a doubler, that is to say a skin portion, metallic or composite for example, applied in superposition on the skin to be repaired at the damaged zone.

The use of such doublers has several drawbacks.

In the first place, the use of a doubler, and more particularly a metallic doubler, adds a certain mass to the panel, which is not desirable.

Also, some panels may have particularly complex geometric structures due, for example, to their location within the propulsion unit (high curvature, unconventional shape, etc.). Thus, it is desired to prepare the doubler via a prior shaping corresponding to the geometry of the panel to be repaired in order to facilitate the laying thereof and to restore the properties of said panel at best.

Such a prior operation is long, complex and expensive.

It is also known to place the whole damaged part in order to be able to repair it in the workshop. The repair is carried out for example by vacuum molding of the doubler on the damaged part by means of a bladder including the entire damaged part, in order to manufacture the doubler made of composite material. This operation is long, expensive and delicate.

Although such a repair is effective, the removal and the laying of the whole part to be repaired are time-consuming and delicate.

In the case where the use of a doubler is difficult or these drawbacks are too significant, there will be no other solution but entirely replacing the damaged panel, which is of course not desirable.

SUMMARY

The present disclosure provides a composite material doubler which is designed to be applied on a damaged portion of a perforated skin, and a method of repairing the damaged perforated skin, characterized in that the method comprises at least:
  one step for applying a sealing film on the damaged portion of the perforated skin in order to temporarily close the perforations of said skin;
  one step for manufacturing the doubler on the sealing film applied beforehand; and
  one step for fastening the doubler to the perforated skin, such that the doubler covers the damaged portion of the perforated skin.

Thus, the present disclosure allows making the doubler directly on the part to be repaired, without having to manufacture a mold in a shape including the part. It should be noted that the application of a sealing film on the perforated skin makes it possible to vacuum mold the doubler directly on the part. Indeed, thanks to the sealing film, the perforations of the perforated skin are closed, thus avoiding any passage of air through said closures. By making a doubler directly on the part to be repaired, it provides that the shape of said doubler will be as close as possible to the shape of the surface of the skin to be repaired. Furthermore, the present disclosure may avoid replacing the entire part.

According to another feature, the application step of the sealing film is preceded by a determination step of the maximum curvature point of the damaged portion, the maximum curvature point serving as a starting point for the application of the sealing film. This allows avoiding the pleats of the sealing film during the laying thereof on the perforated skin, and thus provides the desired sealing for the manufacture of the doubler.

In one form, the sealing film has an outer face which is non-adhesive in order to promote the removal of the doubler and has an inner face which is adhesive in order to promote the adhesion of the sealing film on the perforated skin.

Also, subsequent to the application step of the sealing film, an adhesive tape is placed at least on the peripheral edge of the sealing film, in particular to reinforce the maintaining of the sealing film on the perforated skin and to provide the sealing.

According to another feature of the present disclosure, the manufacturing step of the doubler comprises vacuum molding the doubler by means of a bladder which cooperates with the sealing film in order to form a sealed mold.

As mentioned hereinabove, the present disclosure allows vacuum molding the doubler on the skin to be repaired.

Furthermore, the manufacturing step of the doubler includes an application phase of a seal around the doubler, said seal forming a bead which is interposed between the bladder and the sealing film in order to form a sealed mold.

According to one variation, the seal includes at least one first sealing ring which covers at least the peripheral edge of the adhesive tape and which protrudes over the perforated skin, and a second sealing ring which covers at least the peripheral edge of the first ring and which protrudes over the perforated skin, such that the second sealing ring overlaps the first ring.

In another variation, the doubler manufactured during the manufacturing step may have a plurality of acoustic perforations.

Further, the fastening step of the doubler on the damaged portion of the perforated skin is carried out subsequent to the manufacturing step of the doubler, possibly after the sealing film has been removed from the perforated skin.

The present disclosure also concerns a panel comprising at least one perforated skin, characterized in that it may be obtained by a method according to any one of the preceding claims.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
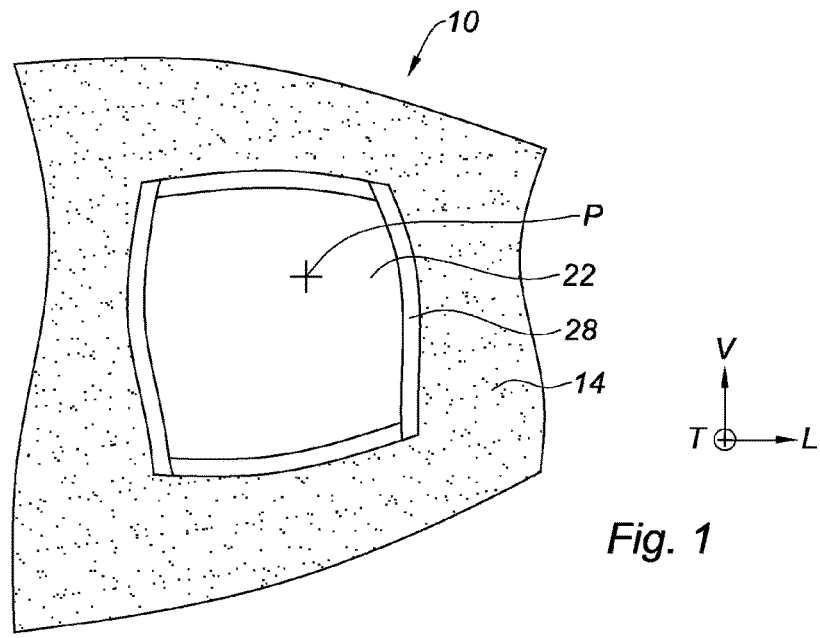
FIG. 1 is a front schematic view, which illustrates a damaged portion of a perforated skin of a panel on which a sealing film is laid, for implementing a method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to clarify the description and the claims, the terminology longitudinal, vertical and transverse will be adopted in a non-limiting way with reference to the trihedron L, V, T indicated in the figures, whose axis L is parallel to the axis of the nacelle.

An acoustic panel 10 which has a generally convex shape and which is designed to equip an aircraft nacelle is represented in FIG. 1. By way of non-limiting example, the present disclosure also applies to an acoustic panel having a concave shape or a double curvature.

Figure 2:
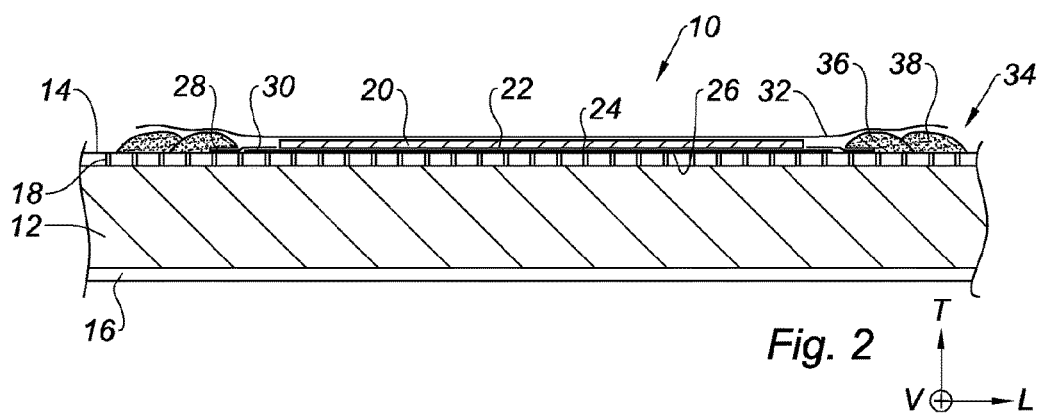
FIG. 2 is a longitudinal cross-sectional schematic view of the panel of FIG. 1, which illustrates a doubler placed under a bladder for implementing a method according to the present disclosure.
Figure 3:
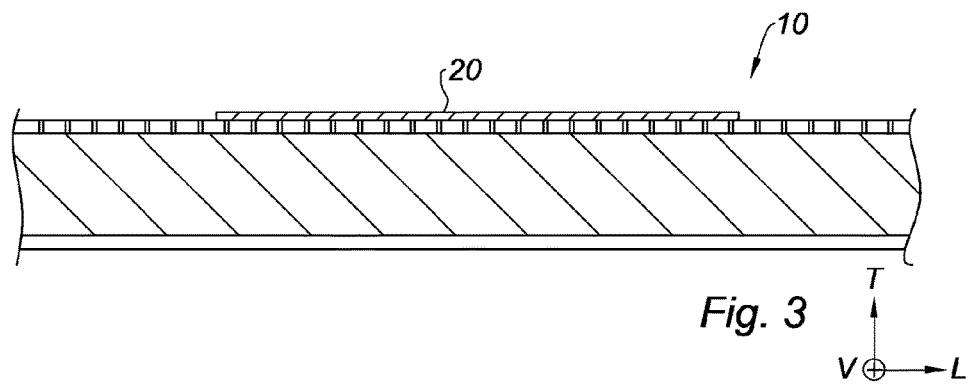
FIG. 3 is a longitudinal cross-sectional schematic view of the panel of FIG. 1, which illustrates the doubler of FIG. 2 fastened on the damaged portion of the panel.

The panel 10 is here of the alveolar-core sandwich type comprising a resonator 12 shown in FIG. 2, for example of the honeycomb type, covered with a perforated outer skin 14, called acoustic skin, and with an inner solid skin 16, called support or structuring skin.

The perforated skin 14 is for example made of a composite material comprising a set of fibers formed by a superposition of fibrous plies, embedded in a polymerized resin.

In order to promote the absorption of the sound waves, the perforated skin 14 includes a plurality of perforations 18.

Also, the perforated skin 14 has a damaged portion that the method according to the present disclosure allows repairing by means of a doubler 20 which is made of a composite material and which is designed to be applied on the damaged portion of the perforated skin 14, in overthickness of said perforated skin. It should be noted that the use of a doubler does not require removing the damaged portion of the perforated skin, because the doubler integrally covers the damaged portion.

The method of the present disclosure includes a determination step of the maximum curvature point P of the damaged portion of the convex perforated skin 14.

Once the maximum curvature point P identified on the damaged portion, the method includes an application step of a sealing film 22 on the damaged portion and beyond, in order to close (at least temporarily) the perforations 18 of the perforated skin 14.

The maximum curvature point P serves here as a starting point for the application of the sealing film 22, in order to promote the application of this film without pleats.

It should be noted that the sealing film 22 may be applied either in one piece or in several pieces.

With reference to FIG. 2, the sealing film 22 has an outer face 24 which is non-adhesive in order to promote the removal of the doubler 20, and an inner face 26 which is adhesive in order to promote the adhesion of the sealing film 22 on the perforated skin 14.

In a complementary manner, subsequent to the application step of the sealing film 22, an adhesive tape 28 is applied on the peripheral edge 30 of the sealing film 22, in particular to reinforce the maintaining of the sealing film 22 on the perforated skin 14, the sealing being more sensitive at the periphery of the film.

The application step of the sealing film 22 is followed by a manufacturing step of the doubler 20 on the sealing film 22.

The manufacturing step of the doubler 20 comprises vacuum molding the doubler 20 by means of a vacuuming bladder 32 which covers the doubler 20. The bladder 32 is this form is an airtight flexible film.

For this purpose, resin pre-impregnated fibrous plies made of a composite material forming the doubler 20 are applied and maroufled on the sealing film 22, such that the doubler 20 perfectly conforms to the shape of the damaged portion of the perforated skin 14 to be repaired.

The manufacturing step of the doubler 20 also includes an application phase of a seal 34 around the doubler 20, as shown in FIG. 2.

The seal 34 forms a bead which is interposed between the bladder 32 and the sealing film 22, such that the assembly constituted by the bladder 32, the seal 34 and the sealing film 22 forms a sealed mold capable of being put under vacuum.

According to another form, the seal 34 includes at least one first sealing ring 36 which covers at least the peripheral edge of the adhesive tape 28 and which protrudes over the perforated skin 14, and a second sealing ring 38 which covers at least the peripheral edge of the first ring 36 and which protrudes over the perforated skin 14, such that the second sealing ring 38 overlaps the first ring 36.

Such an arrangement allows the first cord 36 to be blocked on the perforated skin 14 by the second ring 38, in order to avoid the detachment and the pullout of the first ring 36 by the bladder 32 during putting the bladder 32 under vacuum.

Subsequent to the application of the seal 34 formed by the two rings 36, 38, the bladder 32 is extended above the doubler 20 and the seal 34 such that the bladder 32 cooperates with the sealing film 22 in order to form a sealed mold.

This sealed mold is put under vacuum in order to compact the fibrous plies forming the doubler 20, in particular to evacuate some volatile gases and evacuate the surplus resin.

In a non-limiting way, according to another form according to which the fibrous plies are not impregnated with resin, resin may be injected from the fibrous plies under vacuum, into the mold formed by the bladder 32, the seal 34 and the sealing film 22.

In a non-limiting way, any type of vacuum molding method is conceivable for the shaping of the composite material forming the doubler 20.

According to yet another form, the doubler 20 manufactured during the manufacturing step has a plurality of acoustic perforations (not represented), for the purpose of increasing the acoustic absorption features thereof.

These perforations are for example made by piercing subsequent to the remolding of the doubler 20.

Finally, a method according to the present disclosure includes a fastening step of the doubler 20 on the damaged portion of the perforated skin 14 in order to repair the damaged portion, the fastening step being carried out subsequent to the manufacturing step of the doubler 20, and after removing the sealing film 22 from the perforated skin 14, the adhesive strip 28 and the seal 34.

The doubler 20 is for example fastened by a rivet type mechanical fastening, or by any other adapted fastening means (gluing, etc.).

Alternatively, it may be considered to leave the sealing film 22 in place and to fasten the doubler over the sealing film. This variant might in particular be envisaged when it is expected to fasten the doubler 20 by means of mechanical fasteners.

The present description of the present disclosure is given by way of non-limiting example.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for repairing a damaged portion of a perforated skin of a panel by means of a doubler made of a composite material which is designed to be applied on the damaged portion of said perforated skin, the method comprising:
    applying a sealing film on the damaged portion of the perforated skin in order to temporarily close perforations of said skin,
    manufacturing the doubler on the sealing film applied; and
    securing the doubler to the perforated skin, such that the doubler covers the damaged portion of the perforated skin.

2. The method according to claim 1, wherein the step of applying the sealing film is preceded by a step for determining a maximum curvature point (P) of the damaged portion, the maximum curvature point (P) serving as a starting point for the application of the sealing film.

3. The method according to claim 1, wherein the sealing film has an outer face which is non-adhesive in order to promote removal of the doubler, and the sealing film has an inner face which is adhesive to promote adhesion of the sealing film on the perforated skin.

4. The method according to claim 1, wherein subsequent to the step of applying the sealing film, an adhesive tape is placed at least on a peripheral edge of the sealing film to secure the sealing film on the perforated skin.

5. The method according to claim 1, wherein the step of manufacturing the doubler includes vacuum molding the doubler by means of a bladder which cooperates with the sealing film to form a sealed mold.

6. The method according to claim 5, wherein the step of manufacturing the doubler further includes an application phase of a seal around the doubler, said seal forming a bead which is interposed between the bladder and the sealing film to form the sealed mold.

7. The method according to claim 6, wherein subsequent to the step of applying the sealing film, an adhesive tape is placed at least on a peripheral edge of the sealing film to secure the sealing film on the perforated skin, and wherein the seal includes at least one first sealing ring which covers at least a peripheral edge of the adhesive tape and protrudes over the perforated skin, and at least one second sealing ring which covers at least a peripheral edge of the at least one first sealing ring and protrudes over the perforated skin, such that the at least one second sealing ring overlaps the at least one first sealing ring.

8. The method according to claim 1, wherein the step of manufacturing the doubler includes creating a plurality of acoustic perforations.

9. The method according to claim 1, wherein the step of securing the doubler to the perforated skin is carried out subsequent to the step of manufacturing the doubler.

10. The method according to claim 9, wherein the step of securing the doubler is carried out after the sealing film has been removed from the perforated skin.

* * * * *